United States Patent [19]

Anderson

[11] 4,362,922

[45] Dec. 7, 1982

[54] AIR MAKE-UP UNIT

[75] Inventor: Leroy E. Anderson, Detroit Lakes, Minn.

[73] Assignee: Standex International Corporation, Salem, N.H.

[21] Appl. No.: 210,269

[22] Filed: Nov. 26, 1980

[51] Int. Cl.³ .......................... F24F 7/013; F24H 3/04
[52] U.S. Cl. ........................................ 219/369; 98/31; 219/343; 219/366
[58] Field of Search .............. 219/342, 343, 345, 365, 219/366, 367, 368, 369, 370, 371, 375; 98/29, 31; 237/79; 165/121, 126

[56] References Cited

U.S. PATENT DOCUMENTS

| | | | |
|---|---|---|---|
| 1,442,588 | 1/1923 | Tompkins | 98/29 X |
| 1,677,421 | 7/1928 | Yager et al. | 98/29 |
| 1,713,648 | 5/1929 | Feinberg et al. | 98/29 |
| 1,789,135 | 1/1931 | Chiniewicz | |
| 1,931,156 | 10/1933 | Persons | 98/29 |
| 2,132,263 | 10/1938 | Hambleton | 219/38 |
| 2,285,161 | 6/1942 | Jenn | 98/29 |
| 2,561,928 | 7/1951 | Johnston | 219/34 |
| 2,755,794 | 7/1956 | Wendell | 126/307 |
| 2,787,946 | 4/1957 | Gannon | 98/38 |
| 2,820,880 | 1/1958 | Huntsinger et al. | 219/39 |
| 2,882,383 | 4/1959 | Boyd et al. | 219/39 |
| 2,896,061 | 7/1959 | McMillan | 219/39 |
| 2,917,617 | 12/1959 | Greubel | 219/39 |
| 2,978,568 | 4/1961 | Murphy | 219/39 |
| 2,980,785 | 3/1959 | Whitney, Jr. | 219/34 |
| 3,025,382 | 3/1962 | Eisele | 219/39 |
| 3,028,475 | 4/1962 | Nash | 219/39 |
| 3,059,447 | 10/1962 | Brugler | 62/183 |
| 3,111,573 | 11/1963 | Grone et al. | 219/39 |
| 3,139,020 | 6/1964 | Schemenauer | 98/38 |
| 3,157,776 | 11/1964 | Sohn et al. | 219/369 |
| 3,165,625 | 1/1965 | Potter | 219/369 |
| 3,263,749 | 8/1966 | Dormitzer | 165/122 |
| 3,348,021 | 10/1967 | Skogland et al. | 219/370 |
| 3,590,217 | 6/1971 | Steiner | 219/370 |
| 3,590,218 | 6/1971 | Steiner | 219/370 |
| 3,631,525 | 12/1971 | Brasca | 219/366 |
| 3,731,057 | 5/1973 | Kunz et al. | 219/363 |
| 3,865,182 | 2/1975 | Blossom | 165/27 |
| 3,909,589 | 9/1975 | Stone et al. | 219/361 |
| 3,951,336 | 4/1976 | Miller et al. | 98/1.5 |
| 4,072,187 | 2/1978 | Lodge | 165/48 |

*Primary Examiner*—Roy N. Envall, Jr.
*Attorney, Agent, or Firm*—Schroeder, Siegfried, Vidas, Steffey & Arrett

[57] ABSTRACT

Disclosed is an air make-up unit mounted within the confines of a conventional outside wall of a frame building between the 16" on-center studs. The unit includes a rotary blower with a horizontal tangential discharge, the latter having heating elements therein and being encased in a vertical wall of insulation which extends within an insulated air chamber defined by a telescoping outer casing. Positive air pressure is maintained within the building by air-pressure-sensitive controls located within the building and controlling the two-speed motor. The latter is thermostatically controlled to be operated at a slower speed when colder weather prevails. It is also controlled and energized by a humidistat located within the building to force outside air into the building and diminish the humidity therein when needed.

22 Claims, 6 Drawing Figures

AIR MAKE-UP UNIT

DESCRIPTION

BACKGROUND OF PRIOR ART

Energy and medical experts are becoming more and more concerned in recent years because of indoor air pollution and undesirable conditions which are becoming prevalent as a result of efforts to conserve energy. As heating costs soar, home owners rush to seal their homes with additional insulation and weatherproofing in order to seal out the cold. Such action, however, at the same time seals in harmful pollutants and creates harmful conditions in the form of an inadequate good air supply. Since most people spend most of their time indoors, such harmful conditions are justifiably of much concern.

Older homes leak sufficient air so that a complete air change takes place every one to one and one-half hours. Builders today, however, have reduced air changes due to leakage in the new homes which they build to about one air change every ten (10) hours. Such limited air entrance, coupled with increased consumption and removal of air by various devices within the home, causes a negative pressure to be built up within relatively new and air-tight homes, along with air pollutants which emanate from various products in the home interior, such as particle board which disseminates formaldehyde fumes. Another pollutant given off by rocks, soil and common building materials and found in home interiors is radon, an odorless radioactive gas which has been implicated as a cause of cancer.

Negative pressure conditions within such an air-tight home are particularly attributable to various devices commonly utilized within the home and which either consume oxygen or expel air to the exterior. Examples of the former are fireplaces, wooden stoves and gas or oil-fired water heaters, stoves and clothes dryers. Examples of the latter are kitchen, attic and bathroom ventilation or exhaust fans which actually reduce the overall supply of air within the house. The latter reduces the supply of oxygen, which in turn results in the formation of deadly carbon monoxide by fireplaces and other oxygen consuming devices, which in recent years has caused many accidental deaths.

In addition to the above, many such air-tight homes, particularly those heated by electricity, have high humidity problems which indicates an inadequate supply of fresh air in the interior.

All of the above evidences a need for a controllable supply of fresh outdoor air upon demand. Various air-conditioning equipment has heretofore been provided for introducing air from the exterior into the interior of a building but all of such are necessarily relatively large and unsightly, are necessarily mounted on the exterior or interior of the walls, and require substantial piping to convey the air. United States Pat. No. 2,787,946; No. 4,072,187; No. 2,820,880; No. 2,882,383; and No. 3,165,625 disclose devices which exemplify efforts which may be relevant but are not directed specifically at these conditions. I have provided a very simple, attractive and inexpensive solution for these problems.

BRIEF SUMMARY OF THE INVENTION

My invention provides a simple, attractive and inexpensive air make-up unit which mounts easily within the confines of a standard exterior wall and between two standard 16" on-center studs, with only the air shield protruding therebeyond. The unit introduces outside air into the interior of the building upon need and demand and, if desired, also conditions same while it is being introduced. It creates and maintains a positive pressure within the interior of the building, thereby ensuring an adequate supply of oxygen and improving the operation of the abovenamed devices which require oxygen and/or withdraw air from the interior of the home. Fresh warmed outside air is introduced automatically by my air make-up unit in response to negative pressure, undue humidity, or low temperature conditions within the room. It also automatically compensates for unusually low temperature conditions outside the building.

It is a general object of my invention to provide a simple, attractive and inexpensive air make-up unit which will be easily and inexpensively mounted within the confines and between the studs of a standard exterior wall of a building to introduce outside air into the latter.

A more specific object is to provide such an air makeup unit which will introduce ample supplies of outdoor air into the building's interior and create and maintain a positive air pressure therein.

Another object is to provide such an air make-up unit which will introduce fresh outdoor air into the interior of such a room whenever negative pressure, unduly low temperature, or high humidity conditions exist therein.

BRIEF DESCRIPTION OF THE DRAWINGS

A detailed description of the preferred embodiment of my invention is hereafter described with specific reference being made to the drawings in which.

DETAILED DESCRIPTION OF THE INVENTION

Figure 1:
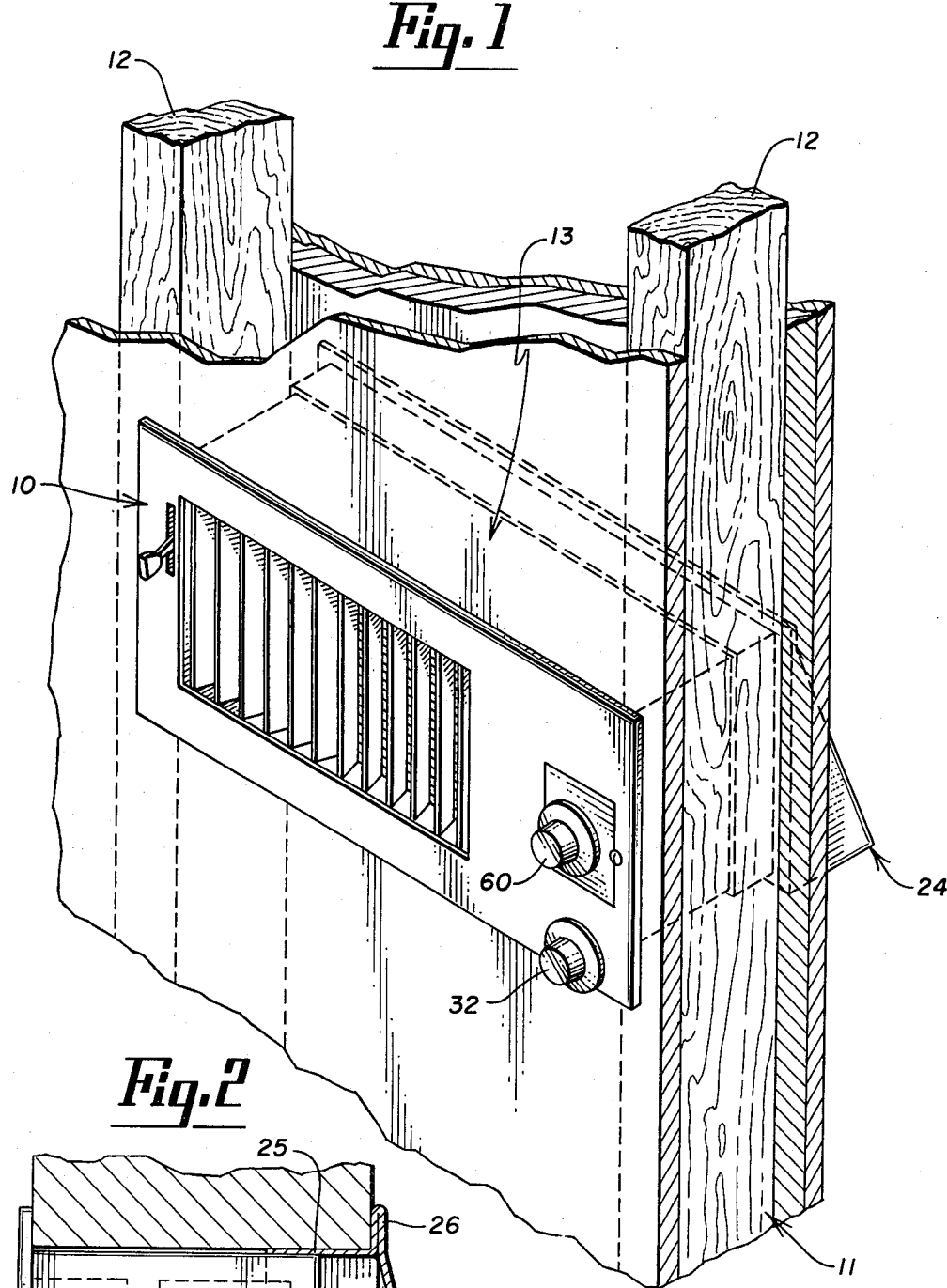
FIG. 1 is a perspective view of an embodiment of my invention mounted in place between the studs and within the confines of a standard wall.
Figure 2:
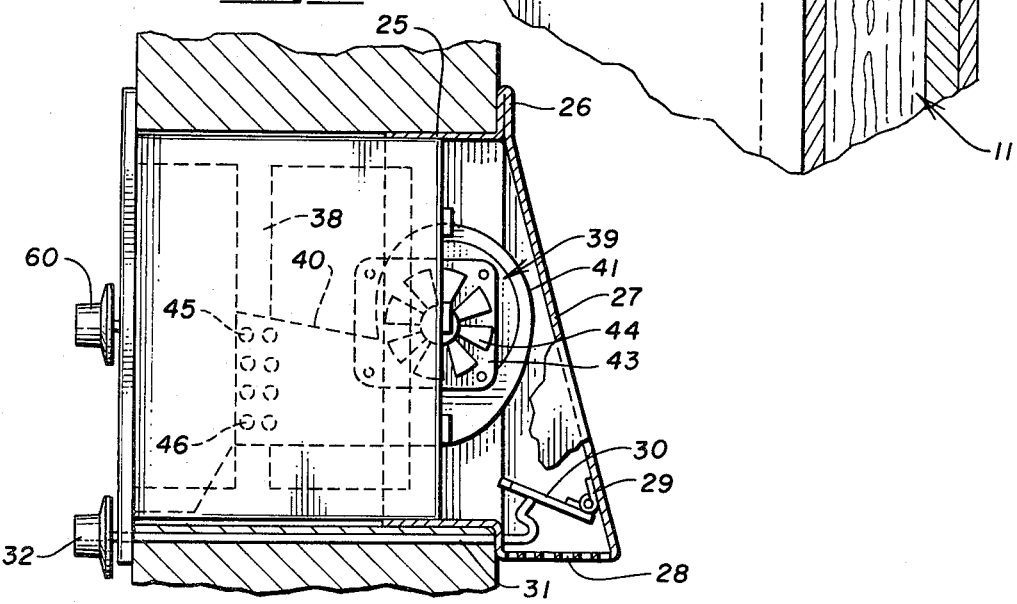
FIG. 2 is a right side elevational view of the unit shown in FIG. 1 with parts cut away and with the wall structure shown in simplified cross-sectional form.

One embodiment of my invention, as shown in FIGS. 1-6, inclusive, includes an air make-up unit identified generally by the numeral 10 mounted within an exterior standard wall 11 of a conventional frame building which is shown only fragmentarily in FIGS. 1-2, inclusive. As shown, such a wall is characterized by a plurality of 16" on-center studs 12 and has a thickness of no less than 5.25-6.0 inches.

Figure 3:
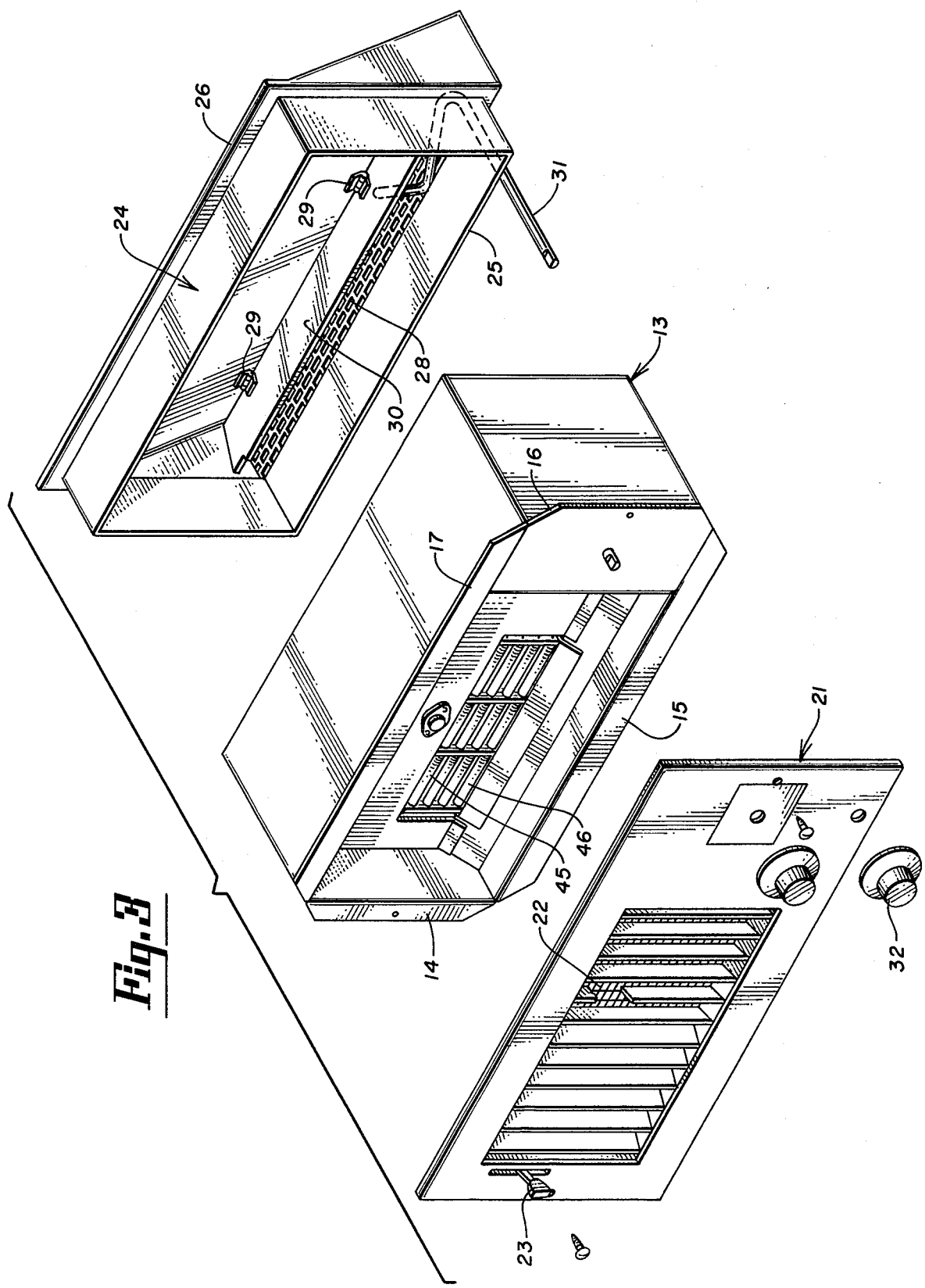
FIG. 3 is an exploded perspective view of my air make-up unit.
Figure 4:
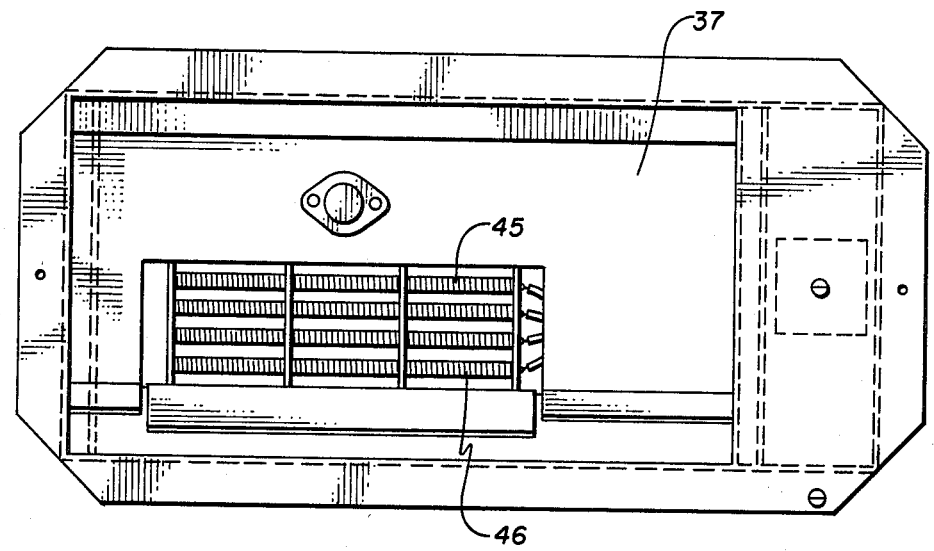
FIG. 4 is a front elevational view of the same with the register panel removed.
Figure 5:
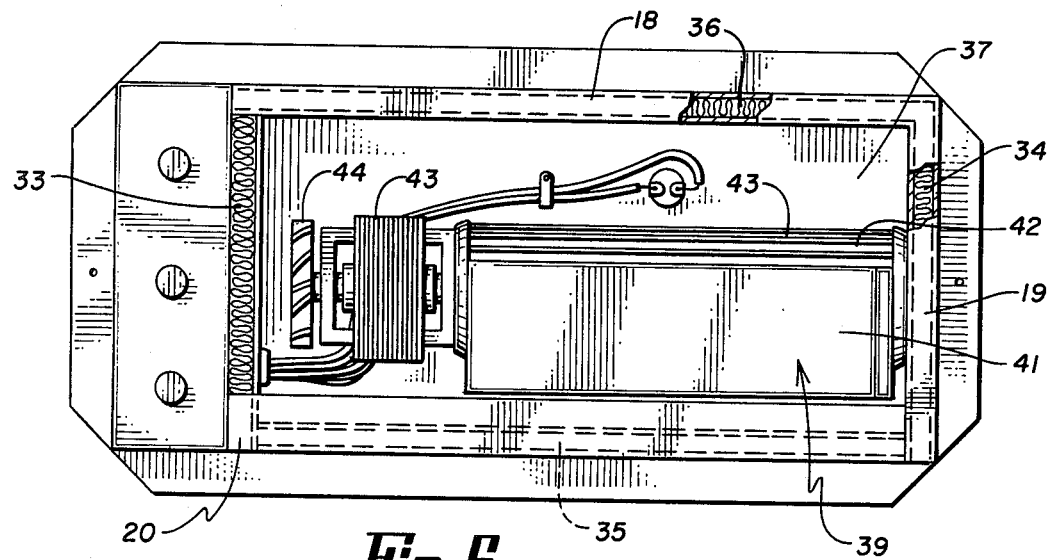
FIG. 5 is a rear elevational view of the same with the wind shield removed.

As shown, my air make-up unit is comprised of an elongated metal casing 13 which is rectangular in cross-section and has an open front surrounded by outwardly extending mounting flanges 14, 15, 16 and 17, an an open rear. The latter has inwardly extending flanges 18, 19 and 20, as best shown in FIG. 5. A front register panel 21 is secured to the flanges 14, 16 by screws, as illustrated in FIG. 3, and is provided with vanes 22 which are manually controllable by control level 23.

An air-intake housing 24 has a tubular forward portion 25 which surrounds the casing 13 in close sliding telescoping relation. The tubular portion 25 has an outwardly extending flange 26 which extends therearound. Extending downwardly and outwardly from the tubular portion 25 is an imperforate air shield 27. Extending inwardly from the lower edge of the shield 27 is a screen member 28 which connects at its forward edge with the casing 13, as best shown in FIG. 2.

Pivotally mounted upon the inner surface of the wind shield 27, as at 29, is a damper 30 which extends throughout the width of the casing and pivots between open position, as shown in FIG. 2 and a closed position (not shown) in which it engages the lower rear edge portions of the casing. This can best be seen in FIG. 2. A control rod 31 which pivots about its longitudinal axis to open and close the damper is operated manually by control knob 32.

Side wall structure 33, 34, together with bottom wall structure 35 and top wall structure 36 within the casing 13 define an interior air chamber 37. This wall structure is packed with ceramic fiber insulation, such as is sold by Carborundum Company, P.O. Box 808, Niagara Falls, New York, N.Y. 14302, under the trademark FIBERFRAX. Such insulation is sometimes referred to as condensed insulation and is known for its high insulating qualities.

Dividing the air chamber 37 midway between the front and back thereof is a vertical wall or panel 38 which extends longitudinally of the casing 13 and is likewise packed with such ceramic fiber insulation throughout its length. Mounted within the air chamber 37 rearwardly of this wall 38 is a squirrel-cage type rotary blower 39 which has a tangential discharge 40 extending forwardly through the wall 38 and terminating at the front or inner surface thereof. The blower 39 has a housing 41 which is open at the top, as shown in FIG. 2, at which point air is picked up by the vanes 42 of the blower.

An electric motor 43 is mounted on the end of the blower housing 41 in driving relation and carries a cooling fan 44.

Mounted within the throat discharge 40 of the blower 39 and extending thereacross is a pair of electrical heating elements 45 and 46. Of course, if desired, more of such elements may be utilized. These heating elements are separately wired and connected to a source of electrical supply, as best shown in FIG. 6, and are energized at different temperature levels as hereinafter described.

The axis of the blower 39 extends longitudinally of the casing 13 and is located, as best seen in FIG. 2, in the same vertical plane as the rear edge of the casing. It is also located in substantially the same horizontal plane as the upper heating element 45.

Figure 6:
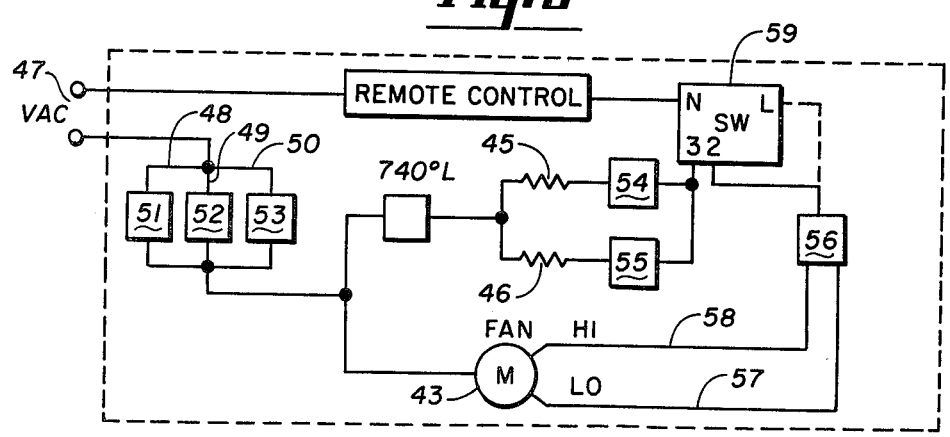
FIG. 6 is a diagrammatic view of the controls and wiring circuit by means of which the unit is operated.

FIG. 6 illustrates the controls and circuits which are used in the operation of my air make-up unit. The electric supply 47 is connected by three separate supply lines 48, 49 and 50 to the heating elements 45, 46 and blower motor 43. Interposed within the supply line 48 is a humidistat 51 which is of the type well known in the art by means of which an electric current is closed when a predetermined humidity level is reached.

Interposed within supply line 49 is an air-pressure-sensitive control 52 of the type sold by Tjernlund Products, Inc., 1620 Terrace Drive, St. Paul, Minn. 55113, and identified as a Pressurestat Control, Model No. P.S. 2501.

Interposed within the supply line 50 is a thermostat 53 of the conventional type well known in the art by means of which an electric circuit is closed when a predetermined temperature level is reached.

Interposed within the circuit for the electric heating element 45 is a conventional thermostat 54 which is located outside the building and, of course, is responsive to the outside air temperature. This thermostat 54 is set to energize the heating element 45 at a relatively high temperature so that it will be energized whenever the outside air is below the temperature desired within the building or room.

Interposed within the circuit for the electric heating element 46 is a second conventional thermostat 55 which is also located outside the building and is also responsive to the outside temperature. It is set so as to energize the thermostat 55 at a considerably lower temperature so that when the outside temperature lowers markedly, this will be compensated for by additional heat being provided as it is discharged from the blower.

The two-speed motor 43 also has a thermostat 56 located outside the building and interposed within its circuit so as to energize the motor at a lower speed whenever the outside temperature drops below the desired level. Thus, when the latter condition prevails, the current will pass through line 57 to cause the motor to run at a lower speed and thus enable the air moved across the heating elements to be more adequately warmed. At higher outside temperatures, the temperature of the moving air will not need to be raised as much and so the circuit is established through high speed line 58.

The air make-up unit described above is wired for 110 volts and will produce 5,100 BTU's of heat per hour when both heating elements are energized. The blower 43 will supply up to 135 cubic feet of air per minute. The selector switch 59 is a manual control to provide blower only operation, or for low heat, high heat, or no heat at all. It is manually controlled through the control knob 60.

From the above, it will be seen that I have provided a novel, simple, attractive and inexpensive air make-up unit which can be installed very simply and easily without any serious modifications to the wall 11. To install, the user merely cuts a hole in the wall between two studs 12 to a height equal to that of the casing 13 and housing 24. The casing is inserted from the inside, the electric wiring is properly connected as described, and the housing 14 is telescoped therearound from the outside until the flange 26 abuts against the outside surface of the wall 11. This provides a very attractive installation which does not interfere with the decor of the building and is relatively inexpensive since no duct work is required. Moreover, it is perfectly safe from a fire danger standpoint in that the insulation described herein more than adequately eliminates danger of overheating of any surface with which the unit comes in contact.

It will also be seen that when the humidity within the building becomes excessive, humidistat 51 will close and blower 43 and heating element 45 will become energized, thereby causing fresh and partially warmed air to be introduced into the building to provide a positive pressure and diminish the humidity gradually, since the outside air will be dryer and some of the inside air will escape.

Similarly, if a negative pressure develops within the building, pressure control 52 will close the circuit and blower 43 will be activated to discharge air into the interior of the building, overcome the deficiency, and eventually produce a positive air pressure within the building.

In the same manner, if the temperature of the room drops below the desired level, thermostat 53 will close the circuit of line 50 and energize the blower 43 and heating element 45, to introduce warm air into the building.

In the event the blower 43 is being operated in any one of the above situations and the outside air proves to be unusually cold, the thermostat 56 will cut out the high speed line 58 and cause the blower to be operated more slowly through line 57 and thereby cause the air moved thereby into the building to be first warmed to a greater extent. Similarly under such conditions, thermostat 55 will close the circuit through heating element 46 so that more heat will be applied to such air.

If desired, the discharge throat of my air make-up unit may be connected directly by a duct to the return air side of a forced-air heating system. This assures an even distribution of air throughout the entire house without any chance of cold air entering the building during severely cold weather. When the blower of the forced-air heating system is on, it will tend to suck air through the make-up unit and will increase the positive air pressure in the house, to thereby ensure movement of air out of the house rather than entrance thereof through infiltration.

In considering this invention it should be remembered that the present disclosure is illustrative only and the scope of the invention should be determined by the appended claims.

I claim:

1. An air make-up system comprising:
   (a) a frame building having a standard exterior wall with vertical studs having standard horizontal distances therebetween, said wall being of standard or greater thickness;
   (b) an elongated metal casing mounted in an opening in said exterior wall between a pair of said studs and having a depth no greater than the thickness of said wall;
   (c) an air intake housing having a tubular forward portion surrounding said casing and extending inwardly in close sliding telescoping relation and having an imperforate shielding wall outside said exterior wall and extending downwardly and outwardly from the upper portions of said housing;
   (d) said housing including a generally horizontal screen member extending inwardly thereacross from the lower portions of said imperforate wall toward said tubular portion of said housing to admit outside air into the interior thereof;
   (e) side, top and bottom wall structure within said casing defining an interior air chamber within said casing and open at the front and rear thereof;
   (f) a rotary blower mounted within said air chamber and having an air-intake in communication with the interior of said housing and having a tangential discharge throat extending horizontally and inwardly therefrom;
   (g) at least one electrical heating element mounted within said blower throat to warm the air driven thereacross by said blower;
   (h) a vertical wall extending longitudinally of said casing and across the interior of said chamber and around said blower throat and sealing the interior of said housing from the interior of said building except for through said blower throat;
   (i) insulation within said vertical wall completely surrounding and insulating the portions of said throat in which said heating element is mounted and insulating the interior of said housing and the outside air from the interior of said building;
   (j) insulation within said side, top and bottom wall structure defining said chamber and completely insulating the outer surfaces of said walls and their surrounding wall structure from the heat generated by said heating element;
   (k) a controllable electric motor mounted within said chamber and connected to said rotary blower in driving relation for driving the same and thereby causing a positive air pressure to be built up within said frame building; and
   (l) means for energizing said heating element as desired.

2. The structure defined in claim 1,
   (m) means electrically connecting said motor with an electric supply; and
   (n) air-pressure-sensitive control means located within said frame building and interposed within said means electrically connecting said motor with an electric supply, to energize and de-energize said motor at pressures below and above, respectively, a predetermined positive air pressure for the interior of said building whereby the interior of said building may be maintained under desirable positive-pressure conditions.

3. The structure defined in claim 1,
   (m) means electrically connecting said motor with an electric supply; and
   (n) humidity-sensitive control means located within said building and interposed within said means electrically connecting said motor with an electric supply, and energizing and de-energizing said motor at humidity levels above and below, respectively, a predetermined humidity level for the interior of said building, whereby outside air will be controllably introduced into the interior of said building to maintain the humidity level therein at the predetermined level.

4. The structure defined in claim 1 wherein said motor is a two-speed motor,
   (m) means electrically connecting said motor with an electric supply; and
   (n) temperature-sensitive speed control means located outside said building in the open air and interposed within said means electrically connecting said motor with an electric supply, to energize said motor at a predetermined speed in response to outside air temperatures above a predetermined temperature and at a slower speed in response to outside air temperatures below said predetermined temperatures, whereby the air moved across said electrical heating element by said blower will be more adequately warmed despite the existence of relatively low air temperatures outside said building.

5. The structure defined in claim 1 wherein it includes a plurality of said heating elements so mounted, and means electrically connecting each of said heating elements with an electric supply; and
   (m) temperature-sensitive control means located outside said building and interposed within said means electrically connecting each of said heating elements with an electric supply, for energizing at least one of said heating elements at outside air temperatures below a predetermined temperature and for energizing at least an additional one of said heating elements at outside air temperatures below a second and lower predetermined temperature, whereby the air moved over said heating elements by said blower will be adequately warmed despite the existence of relatively low air temperatures outside said building.

6. The structure defined in claim 1,
   (m) means electrically connecting said heating element with an electrical supply; and
   (n) temperature-sensitive control means located outside said building and interposed within said means electrically connected said heating element with an electrical supply, and energizing and de-enegizing said heating element at outside air-temperatures below and above, respectively, a predetermined air temperature, whereby outside air forced into said building by said blower will be adequately preconditioned as to temperature as desired prior to its introduction.

7. The structure defined in claim 1, wherein it includes a plurality of said heating elements so mounted,
   (m) means electrically connecting said motor with an electric supply,
   (n) air-pressure-sensitive control means located within said frame building and interposed within said means electrically connecting said motor with an electric supply, and energizing and de-energizing said motor in response to pressures below and above respectively, a predetermined positive air pressure for the interior of said building whereby the interior of said building may be maintained under desirable positive pressure conditions, and
   (o) temperature-sensitive control means located outside said building and interposed within said means electrically connecting said heating elements with the electrical supply, and energizing at least one of said heating elements in response to outside air temperatures below a predetermined temperature and energizing at least an additional one of said heating elements in response to outside air temperatures below a second and lower predetermined temperature whereby the air moved over said heating elements by said blower will be adequately warmed despite the existence of relatively low outside air temperatures.

8. The structure defined in claim 1 wherein it includes a plurality of said heating elements so mounted, and said motor is a variable speed motor,
   (m) means electrically connecting said motor with an electric supply,
   (n) air-pressure-sensitive control means located within said frame building and interposed within said means electrically connecting said motor with an electric supply, and energizing and de-energizing said motor at pressures below and above, respectively, a predetermined positive air pressure for the interior of said building whereby the interior of said building may be maintained under desirable positive pressure conditions, and
   (o) temperature-sensitive speed control means located outside said building in the open air and interposed within said means electrically connecting said motor with an electric supply, and energizing said motor at a predetermined speed in response to outside air temperatures above a predetermined temperature and at a slower speed in response to outside air temperatures below said predetermined temperature, whereby the air moved across said electrical heating element by said blower will be more adequately warmed despite the existence of relatively low air temperatures outside said building.

9. The structure defined in claim 1, wherein said motor is a variable speed motor,
   (m) means electrically connecting said motor with an electric supply,
   (n) humidity-sensitive control means located within said building and interposed within said means electrically connecting said motor with an electric supply, and energizing and de-energizing said motor at humidity levels above and below, respectively, a predetermined humidity level for the interior of said building, whereby outside air will be controllably introduced into the interior of said building to maintain the humidity level therein at the predetermined level, and
   (o) temperature-sensitive speed-control means located outside said building in the open air and interposed within said means electrically connecting said motor with an electric supply, and energizing said motor at a predetermined speed in response to outside air-temperatures above a predetermined temperature, and at a slower speed in response to outside air-temperatures below said predetermined temperatures whereby the air moved across said electrical heating element by said blower will be more adequately warmed despite the existence of relatively low air temperatures outside said building.

10. The structure defined in claim 1, wherein said motor is a two-speed motor,
    (m) means electrically connecting said motor with an electric supply, and
    (n) temperature-sensitive control means located within said building and interposed within said means electrically connecting said motor with an electric supply, and energizing said blower and said heating element in response to temperatures within said builing below a predetermined temperature and de-energizing said blower and said heating element in response to temperatures within said building above said predetermined temperature.

11. The structure defined in claim 1 wherein the axis of said rotary blower is in substantially the same vertical plane as the rear end of said casing.

12. The structure defined in claim 1 wherein the upper portion of said heating element is in substantially the same horizontal plane as the axis of said rotary blower.

13. The structure defined in claim 1 wherein approximately one-half of said rotary blower extends into said housing.

14. The structure defined in claim 1 wherein said rotary blower has a housing which has an upwardly facing air-intake opening in its upper portions.

15. The structure defined in claim 1 wherein the depth of said casing is less than 5.5 inches.

16. An air make-up unit comprising:
    (a) an elongated metal casing constructed and arranged to be mounted within an opening between the studs of a standard exterior wall of a building;

(b) said casing having a length less than the spacing between the studs of such a standard exterior wall of a building and having a depth substantially no greater than the thickness of such a wall;

(c) an air intake housing having a tubular forward portion surrounding said casing in close sliding telescoping relation and having an imperforate end wall extending downwardly and outwardly from the upper portions thereof;

(d) said housing including a generally horizontal screen member extending inwardly thereacross from the lower rear edge portions of said imperforate wall toward said tubular portion to admit outside air into the interior of said housing;

(e) side, top and bottom wall structure within said casing defining an interior air chamber open at the front and rear ends of said casing;

(f) a rotary blower mounted within said air chamber and in communication with the interior of said housing and having a tangential discharge throat extending horizontally and forwardly therefrom;

(g) at least one electrical heating element mounted within said blower throat to warm the air passed therethrough by said blower;

(h) vertical wall extending longitudinally of said casing and across the interior of said chamber and around said blower throat and sealing the interior of said housing from the discharge of said blower throat except for through said blower throat;

(i) insulation within said vertical wall completely surrounding and insulating the portions of said throat in which said heating element is mounted and insulating the interior of the housing from the opposite side of said vertical wall;

(j) insulation within said side, top and bottom wall structure defining said chamber and completely insulating the outer surfaces of said walls from the heat generated by said heating element;

(k) a controllable electric motor mounted within said chamber and connected to said rotary blower for driving the same as desired to cause a positive air pressure to be built up within such a building when said casing is so mounted;

(l) means for energizing said heating element as desired.

17. The structure defined in claim 16
(m) means for electrically connecting said motor with an electric supply; and
(n) room air-pressure-sensitive control means interposed within said means for connecting said motor with an electric supply, to energize and de-energize said motor at pressures below and above, respectively, a predetermined air pressure level for the interior of a room whereby interior of the room may be maintained under positive pressure conditions.

18. The structure defined in claim 16
(m) means for electrically connecting said heating element with an electric supply; and
(n) outside-air temperature-sensitive control means interposed within said means for connecting said heating element with an electric supply to energize and de-energize said heating element at outside air temperatures below and above, respectively, a predetermined air temperature, whereby outside air forced into such a residence by said blower will be pre-conditioned as to temperature as desired prior to its introduction.

19. The structure defined in claim 16
(m) means for electrically connecting said motor with an electric supply; and
(n) room-humidity sensitive control means interposed within said means for connecting said motor with an electric supply to energize and de-energize said motor at humidity levels above and below, respectively, a predetermined humidity level for the interior of a room whereby outside air will be controllably introduced into the interior of the room to maintain the humidity level therein at the predetermined level.

20. The structure defined in claim 16 wherein said motor is a two-speed motor
(m) means for electrically connecting said motor with an electric supply; and
(n) outside-air temperature-sensitive control means interposed within said means for electrically connecting said motor with an electric supply, to energize said motor at a predetermined speed at outside air-temperatures above a predetermined temperature and at a slower speed at outside air-temperatures below said predetermined temperature, whereby the air moved across said electrical heating element by said blower will be adequately warmed despite the existence of relatively low outside air temperatures.

21. The structure defined in claim 16 wherein it includes a plurality of said heating elements so mounted, and means for electrically connecting each of said heating elements with an electric supply; and
(m) outside-air temperature-sensitive control means for electrically connecting each of said heating elements with an electric supply for energizing at least one of said heating elements at outside air-temperatures below a predetermined outside-air temperature, and for energizing at least an additional one of said heating elements at outside air temperatures below a second and lower predetermined air temperature, whereby the air moved over said heating elements by said blower will be adequately warmed despite the existence of relatively low outside-air temperatures.

22. The structure defined in claim 16, and
(m) damper means controllable from the front of said casing and located within said air intake housing in opening and closing relation with said screen member to control the admission of outside air therethrough.

* * * * *